United States Patent [19]
Abdel-Malek et al.

[11] Patent Number: 5,616,824
[45] Date of Patent: Apr. 1, 1997

[54] INSTRUMENT FOR DETECTING POTENTIAL FUTURE FAILURES OF VALVES IN CRITICAL CONTROL SYSTEMS

[75] Inventors: Aiman A. Abdel-Malek, Schenectady; John E. Hershey, Ballston Lake, both of N.Y.; Amer A. Hassan, Cary, N.C.

[73] Assignee: General Electric Company, Schenectady, N.Y.

[21] Appl. No.: 517,884

[22] Filed: Aug. 21, 1995

[51] Int. Cl.⁶ .................................................. G01M 13/02
[52] U.S. Cl. ........................ 73/1.01; 73/168; 364/571.04; 324/73.1
[58] Field of Search ................ 73/168, 4 R; 364/571.04; 324/73.1

[56] References Cited

U.S. PATENT DOCUMENTS

| | | | |
|---|---|---|---|
| 4,094,308 | 6/1978 | Cormier | 364/571.04 |
| 4,506,539 | 3/1985 | Hessler | 73/4 R |
| 4,896,101 | 1/1990 | Cobb | 73/4 R |

*Primary Examiner*—Maura K. Regan
*Assistant Examiner*—Jose M. Solis
*Attorney, Agent, or Firm*—Marvin Snyder

[57] ABSTRACT

Apparatus for monitoring the health and response of critical electromechanical control valves to detect the likelihood of future valve malfunction includes the use of Fourier transform decomposition and time-domain wavelets to selectively enhance portions of the valve response signal for comparison with a normal valve response signal.

14 Claims, 3 Drawing Sheets

(1)

INSTRUMENT FOR DETECTING POTENTIAL FUTURE FAILURES OF VALVES IN CRITICAL CONTROL SYSTEMS

BACKGROUND OF THE INVENTION

This invention relates to an instrument for monitoring and detecting the health or well being of critical valves, and in particular the health of electromechanical valve such as those used in nuclear power plants.

Electromechanically operated valves are extensively used in industrial processes and in other applications in which their failure can cause serious damage or even be catastrophic regarding property and life. For example, in the control systems of power generation and in particular the cooling of equipment such as nuclear power generators, chemical plants utilizing inflammable and/or hazardous materials, and in the control systems of aircraft, the failure of one or more electrically actuated valves at a critical period could lead to disaster. For example, in a nuclear power plant, control valves are frequently utilized for safety systems such as control of cooling water to prevent nuclear meltdown. In flight control systems valve actuation provides automatic control, for example, of a high speed fighter aircraft. Failure of a control valve in such systems to respond to a control signal obviously could result in serious consequences.

While it is common in critical control systems to utilize redundancy, a duplicate or redundant stand-by control system or subsystem for use in the unlikely case of failure of the primary system is not only expensive and complex, it requires means to detect the failure of the primary system followed by actuation of the redundant or backup system after first switching the redundant system into the control loop of the control system while also disconnecting the malfunctioning primary system. The additional equipment and complexity in such switching and substitution not only introduces a time delay into obtaining corrective action of the control system, but also introduces additional equipment including the switching equipment which in itself can malfunction.

It is accordingly highly desirable to be able to monitor the health of electromechanical valves in critical systems such as nuclear control systems and to detect potential future failures of critical valves in advance of failure, to enable replacement of the unhealthy valve prior to failure in order to assure continuing prompt and proper response of the control system. This does not mean that the primary control system cannot include redundancy backup, but rather contributes to increased safety and improved performance of the overall system by maintaining the primary control system in operation by enabling replacement in advance of failure of those critical valves which exhibit an unhealthy control response and a potential for failure.

In analyzing the health and performance of an electromechanical valve, it is possible to analyze the valve operation by comparing or correlating the actual valve response signal with a normal valve response signal. In order to detect inchoate problems to enable predictive and preventative maintenance, it is desirable to be able to detect and analyze variations in the time behavior of the valve, that is deviations from normal valve response operation. Such variations can be caused by sticking of the valve, or by excess friction and can be used as an indication of the health of the valve and the desirability to replace the abnormally operating valve prior to an actual failure even though the valve is still opening and closing in response to the input control signal.

However, electromechanical valves in applications such as nuclear power plants and in the environments described above operate in a power and control circuit environment in which the background noise is not Gaussian noise, but rather is pulsed noise such that a cross-correlation method of signal analysis is not very effective since its operation is based on an additive white noise Gaussian environment. Since the noise from electrical control and machinery systems is different, and often includes spikes, cross correlation is not necessarily an effective method for good signal discrimination. Noise and electrical disturbance or interference which may exceed any predetermined threshold value can cause false failure indications in cross-correlation methods. For the same reason, a matched filter does not provide good signal processing for such control systems and traditional optimum estimates are not optimal in the presence of noise which is other than Gaussian.

One method of providing a critical valve health monitoring instrument is disclosed in our copending patent application entitled "Instrument For Detecting Potential Future Failures Of Values In Critical Control Systems", Ser. No. 08/371,716 filed Jan. 12, 1995, assigned to the same assignee as the subject invention, and hereby incorporated by reference.

That instrument has solved the problems discussed above. However, for certain applications, it is desirable that the instrument be made as insensitive to time shift as possible without the need for a synchronizing signal in an uncomplex instrument.

Moreover, instruments to monitor the health of critical valves must be relatively inexpensive and easy to install, not only on new control systems but in retrofitting existing control systems. In addition, it is highly desirable that a single apparatus be able to periodically monitor a plurality of valves in order to minimize the cost and complexity of the monitoring.

SUMMARY OF THE INVENTION

It is an object of the present invention to provide apparatus for monitoring the health of critical control valves to predict a potential failure and enable replacement in advance of the failure.

It is another object of the present invention to provide apparatus for monitoring the health of critical electromechanical valves which is insensitive to time shift, is uncomplex and hence relatively inexpensive and easy to install.

It is yet another object of the present invention to provide apparatus for monitoring the health of critical electromechanical control valves in order to predict potential failures, and which may be readily retrofitted into existing control systems.

In accordance with one form of the invention, the apparatus includes a valve and an electromagnetic actuator to actuate the valve in response to a valve control signal. The monitor which monitors the response of the valve upon actuation compares the valve response signal with a normal valve response signal. Differences between the signals are used to evaluate the likelihood of future malfunction of the valve, and the monitor includes correlation means including a wavelet processor to analyze a time warped signal. The warped signal is processed through a Fourier transform magnitude compiler and Haar wavelet decomposer which enables evaluation of the valve response signal against a normal signal. The results may either be visually displayed or automatically formatted by a pattern recognition circuit.

Any differences between the signals which exceed a predetermined amount can be used to trigger an alarm to indicate the likelihood of future malfunction of the valve.

Figure 1:
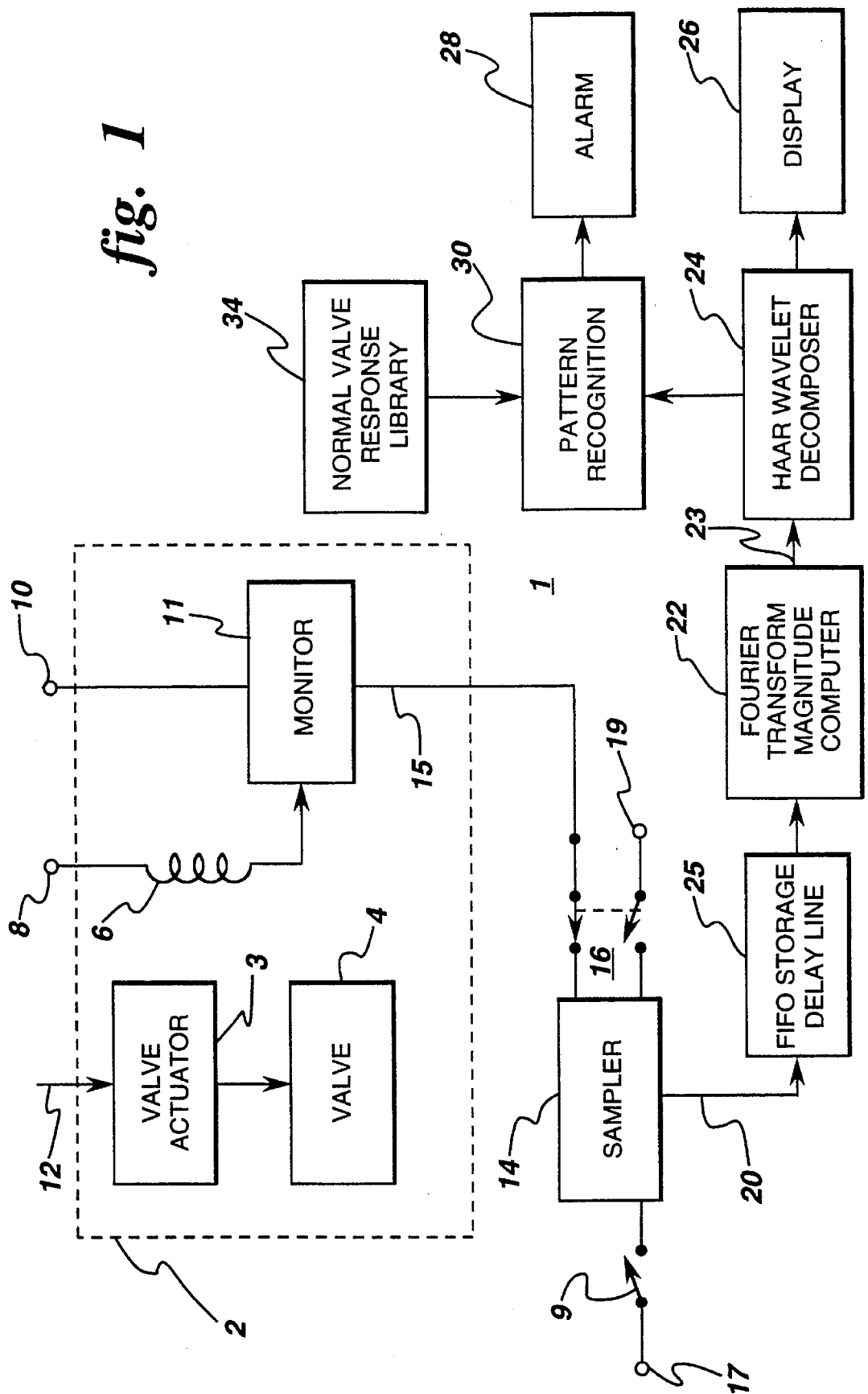
FIG. 1 is a block diagram showing the present invention.
Figure 2:
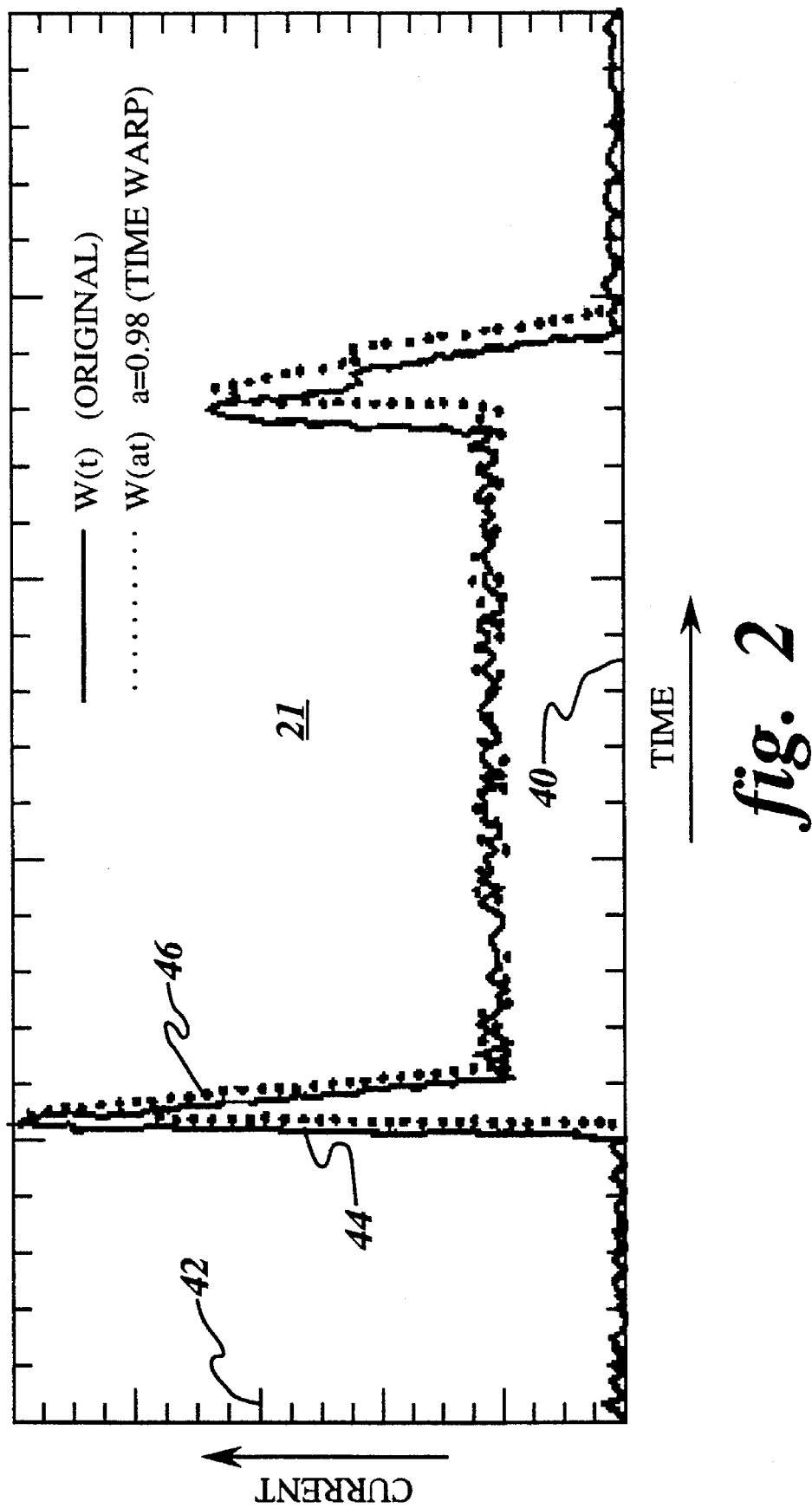
FIG. 2 is a plot showing the time warp of the valve response signal of FIG. 1.

Referring first to FIGS. 1 and 2, valve assembly 2 includes an electromechanical valve actuator 3 which may be of the solenoid type, and which moves valve 4 in response to valve input valve control signal 12. Power to solenoid 6 is provided from power lines 8, 10. The response of valve 4 to control signal 12 is sensed by sensor or monitor 11 which detects an electrical or mechanical characteristic of the actuator, such as actuator current or torque, to provide valve response signal 15 responsive to the magnitude and time of the actual valve response.

Sampler 14 is an analog to digital converter, or digital converter, and converts the analog valve response signal 15 to digital form for signal processing by apparatus 1 which monitors the health or operation of valve assembly 2. Valve response signal 15 is provided to sampler 14 through switch 16.

Additional inputs through switch 16 and switch 9 from connections 17 and 19, respectively, enable sampler 14 to be selectively and sequentially connected to, and sample, a plurality of different valve assemblies such as valve assembly 2 to enable apparatus 1 to monitor the health of a plurality of electromechanical valves by sequentially being connected to the valves in order to compare their actual valve response signals with their normal valve response signal.

A Fourier transform magnitude computer 22 provides digital signals representing valve response signal 15 to Haar wavelet decomposer 24 through connection 23.

FIG. 2 illustrates a version of a time warped signal. Plot 21 shows a time warped signal conveyed on 20. Time is plotted on the X-axis 40 and valve actuator current sensed by monitor 11 or valve response signal 15 is plotted on Y-axis 42. The normal valve response curve is shown by 44. The time warped signal is shown by 46. Signal 20 is then fed through Fourier transform magnitude computer 22 (FIG. 1) for subsequent analysis utilizing the magnitude of the transform.

Fourier transform magnitude computer 22 computes the magnitude of the Fourier transform of a set of digital samples 20 provided by sampler 14. The sequential digital samples 20 are saved in a suitably long FIFO (first-in, first-out) delay circuit 25. When valve 3 response activity is detected Fourier transform magnitude computer 22 waits until the valve action finishes and then computes the Fourier transform magnitude of the saved sequential samples 20 without exact time registration and without regard to the time equals zero of signal 15. Thus Fourier transform computer 22 begins its computation at any or different offset times which becomes of no concern as long as the sample is of the whole valve response signal. The system is thus made insensitive to time shift and does not require a precision or any synchronizing means for sampler 14.

Figure 5:
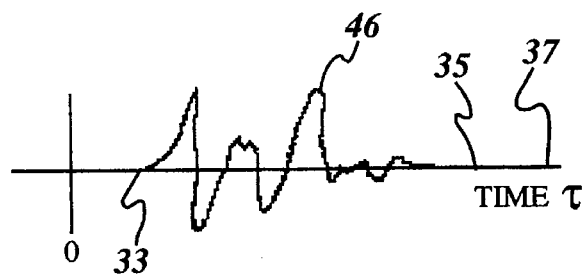
FIG. 5 is a plot useful in explaining the operation of the Fourier transform magnitude computer of FIG. 1.

This is illustrated in FIG. 5. Referring to FIG. 5 in conjunction with FIG. 1, time warped valve response signal 46 is provided to Fourier transform magnitude computer 22 at a time later than τ=0, but the Fourier magnitude is unaffected since the whole valve signal is sampled, saved in FIFO storage delay line 25 and processed in Fourier transform magnitude computer 22 over a period 33–37 encompassing the time when valve action stops at time 35.

A suitable Fourier transform magnitude computer is a combination of integrated circuits types PDSP16510A and PDSP1630 manufactured by GEC Plessey.

Figure 3:
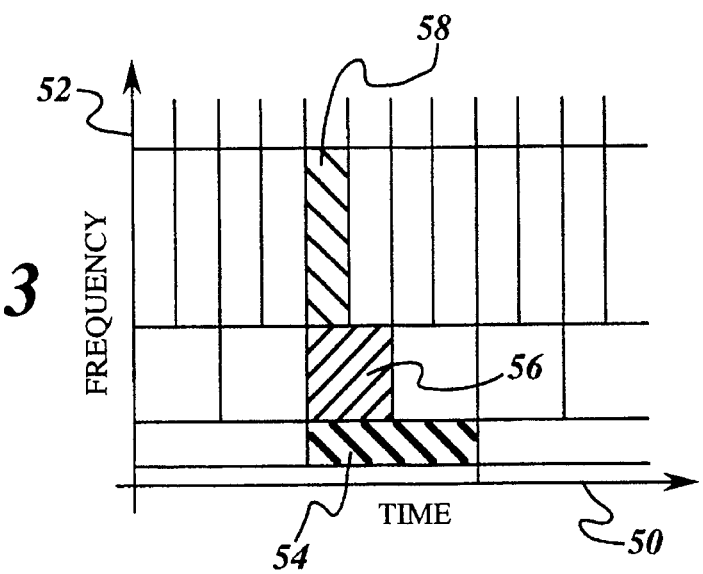
FIG. 3 illustrates tiling in wavelet decomposition of FIG. 1.

FIG. 3 illustrates in somewhat simplified form the wavelet tiling utilized in Haar wavelet decomposer 24 of FIG. 1 in response to the signal input from Fourier transform magnitude computer 22. Referring to FIG. 3, the intervals or tiles 54, 56 and 58 represent dyadic tiling in that tiles 54, 56 and 58 illustrate doubling of the frequency while halving the time for each successive tile. The ability to vary the time and/or frequency of each tile provides an ability to selectively enhance portions of the time warped valve response signal to enhance and select those tiles or segments of valve response signal 15 (FIG. 1) including signal information to the exclusion of tiles including noise information.

As shown is FIG. 1 the output of Haar wavelet decomposer 24 may be provided to a pattern recognition circuit 30 which may include a library 34 of normal signatures of valve response operation for reference purposes. This enables recognition of time changes in valve operation such as those caused by sticking of the valve or increased friction in the operation of the valve.

Since wavelet decomposer 24 enables an enhancement of certain scales, the most germane scales can be enhanced for analysis. The operation of wavelet recognition and tiling is described in some detail in copending U.S. patent application, Ser. No. 08/311,698 of Aiman Abdel-Malek and Max Costa, filed Sep. 23, 1994, entitled "Speckle Noise Filtering in Ultrasound Imaging", which is assigned to the same assignee as the subject invention and hereby incorporated by reference.

The output of wavelet decomposer 24 is provided to visual display 26, which may conveniently be a cathode ray tube or a liquid crystal display for observation of differences or changes with time of valve response signal 15. An alarm 28 may be provided to sound an audible alarm or present a visible alarm such as a blinking red light in the event that the deviation of the valve response from normal response exceeds a predetermined value.

Figure 4:
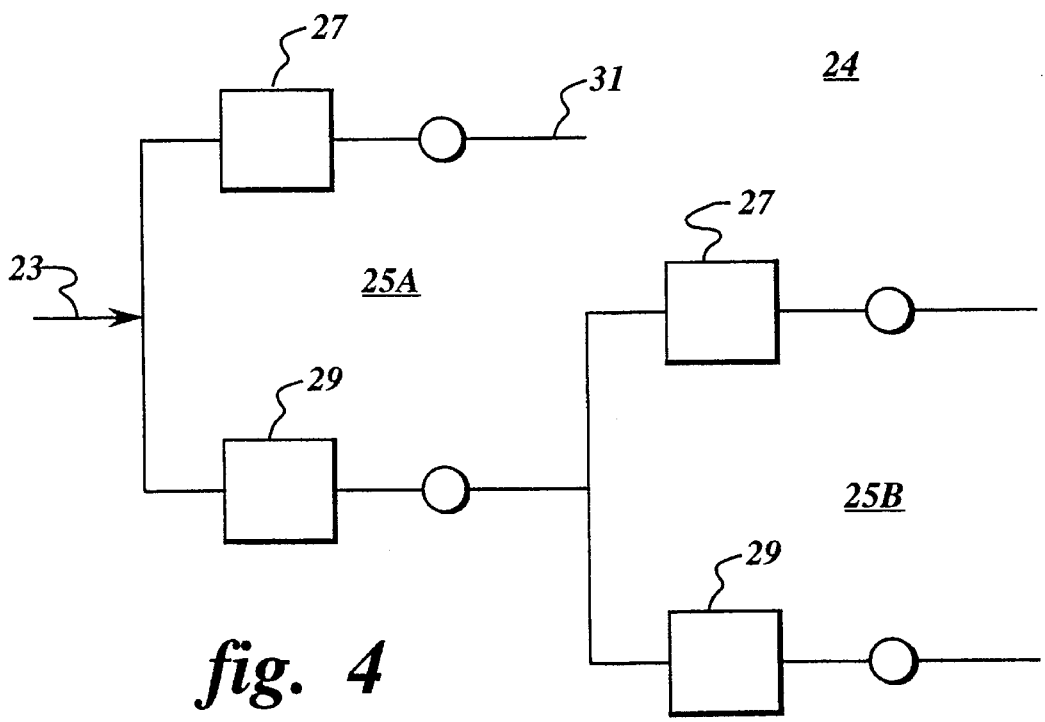
FIG. 4 is a schematic representation of the signal processing of FIG. 1.

FIG. 4 is a schematic representation of the signal processing flow of Haar wavelet decomposer 24 of FIG. 1. Referring to FIG. 4, input signal 23 is progressively fed through a series of quadrature mirror filteriny circuits 25A and 25B; each of which includes a pair of sum and differencing circuits 27 and 29. Input signal 23 in circuit 25 passes through circuit 27 which provides pair-wise differences signal 31, while input signal 23 passes through circuit 29 which forms pair-wise sums which are fed to both circuits 27 and 29 in quadrature mirror filtering circuit 25B. The output from circuit 27 of 25B is pairwise differences and the output from circuit 29 is pair-wise sums.

For an example, consider a Haar wavelet multiscale decomposition of N=8 sequential datavalues denoted by $y_1$, $y_2$, $y_3$, $y_4$, $y_5$, $y_6$, $y_7$, and $y_8$. The signal processing procedure in Haar wavelet decomposer 24 (FIG. 1) is expressed as follows:

$$\begin{vmatrix} y_1 \\ y_2 \\ y_3 \\ y_4 \\ y_5 \\ y_6 \\ y_7 \\ y_8 \end{vmatrix} \begin{array}{c} \text{alternate} \\ \text{sums} \\ \text{and} \\ \text{differences} \\ \rightarrow \end{array} \begin{vmatrix} y_1 + y_2 \\ y_1 - y_2 \\ y_3 + y_4 \\ y_3 - y_4 \\ y_5 + y_6 \\ y_5 - y_6 \\ y_7 + y_8 \\ y_7 - y_8 \end{vmatrix} \begin{array}{c} \text{Permute} \\ \text{or} \\ \text{rearrange} \\ \rightarrow \end{array} \begin{vmatrix} y_1 + y_2 \\ y_3 + y_4 \\ y_5 + y_6 \\ y_7 + y_8 \\ y_1 - y_2 \\ y_3 - y_4 \\ y_5 - y_6 \\ y_7 - y_8 \end{vmatrix} \begin{array}{c} \text{sums} \\ \text{and} \\ \text{differences} \\ \rightarrow \end{array}$$

$$\begin{vmatrix} y_1 + y_2 + y_3 + y_4 \\ y_1 + y_2 - y_3 - y_4 \\ y_5 + y_6 + y_7 + y_8 \\ y_5 + y_6 - y_7 - y_8 \\ y_1 - y_2 \\ y_3 - y_4 \\ y_5 - y_6 \\ y_7 - y_8 \end{vmatrix} \begin{array}{c} \text{Permute} \\ \rightarrow \end{array} \begin{vmatrix} y_1 + y_2 + y_3 + y_4 \\ y_5 + y_6 + y_7 + y_8 \\ y_1 + y_2 - y_3 - y_4 \\ y_5 + y_6 - y_7 - y_8 \\ y_1 - y_2 \\ y_3 - y_4 \\ y_5 - y_6 \\ y_7 - y_8 \end{vmatrix} \begin{array}{c} \text{Wavelet} \\ \text{co-} \\ \text{efficients} \end{array}$$

The above procedure can be accomplished utilizing the sum/difference circuitry described in "Architecture of the Fast Welsh-Hadamard and Fast Fourier Transforms with charge Transfer Devices" by Rao Yarlagadda and John E. Hershey, one of the inventors of the present invention, which appeared in Volume 51, Number 5 ( 1981) of the International Journal of Electronics, which paper is hereby incorporated by reference, with the above permute function added. However, the Haar wavelet decomposition would, of course, be utilized, with pyramidal signal processing rather than being based on differences once formed. In the Haar wavelet decomposition the differences are carried along.

The use of a wavelet decomposer, such as a Haar wavelet decomposer 24, as shown in FIG. 1, enables an enhanced signal presentation of what is desired to be compared of the actual valve responsesignal to a normal valve response signal provided by valve response library 34 even in the presence of noise, and enables an examination of the behavior of valve response signal 15 over those different time and frequency bands or scales of interest, enabling enhancement of tiles of particular signal interest to enhance the valve response signal. Wavelet decomposer 24 could be of wavelet types other than Haar wavelet decomposition. Other types include Daubechies wavelet decomposition which is described in detail in the article entitled "The Wavelet Transform, Time-Frequency Localization and Signal Analysis" by Daubechies which appeared in IEEE Trans. Info. Theory, Vol. 41, pp. 961–1005, 1990, and which is hereby incorporated by reference. However Haar wavelet decomposition is computationally simpler and particularly suited for use in the instant invention.

The Haar wavelet decomposition is essentially the result of cross correlating the wavelet represented at different time scales with the waveform under study. Since the Haar wavelet decomposition involves different time scales, all members of the wavelet decomposition at a particular time scale are easily compared without scaling within the particular timescales. Subtle differences between the time warped signals are made more visible in selected wavelet tiles; in fact, as indicated in FIG. 1, the enhanced differences can be spotted automatically by simple pattern recognition devices 30, or alternatively be displayed on a suitable display or oscilloscope 26. Alarm 28 can be provided for an audible or visible alarm to draw attention to any deviation which exceeds a predetermined amount from preset values based on the normal or healthy valve normal response stored in normal valve response library 34 as determined by pattern recognition circuit 30.

The uneven tiling of wavelet decomposer 24 enables the analysis, such as frequency analysis with time, to be expanded or emphasized in particular tilings to better analyze and distinguish deviations from a normal valve response. This dissects a valve response signal 15 to better enable analysis of the valve response signal and not the noise. A valve response signal 15, and the noise associated with the valve response signal may not affect all scales equally such that wavelet decomposition enables the selection of scales and tiles where the signal rather than noise is most prevalent for the signal which is sought to be isolated or analyzed. That is, tiling picks out regions where the valve response signal 15 is strongest, enabling isolation of the spectral domain of the signal of a particular malfunction.

Unlike filtering, which would diminish or attenuate a valve response signal passing through the filter, the subject system passes both signal and noise, with the tiling enabling analysis of those regions where the unattenuated valve response signal is strongest.

The detection of time warping of valve response signal 15 by comparing its Fourier transform with the Fourier transform of a normal valve response signal would be difficult to distinguish since magnitude tends to change by many orders of magnitude over frequency and provides no localization or enhancement of time. A wavelet decomposition however involves different time scales and all members of the wavelet decomposition at a particular time scale are easily compared without scaling within the particular time scale.

The subtle differences between the time-warped valve response signal 46 (see FIG. 2) and a normal valve response signal 44 are quite visible in some of the wavelet decomposition scales such that these differences can be spotted automatically by simple pattern recognition devices, as discussed above. The Haar is a particularly "friendly" wavelet in terms of performing the decomposition with a modicum of hardware. It is related to the Walsh-Hadamard transform which can be synthesized using only additions and subtractions. The Haar transform can be made to operate very quickly on relatively little hardware with little power, facilitating solid state equipment for retrofitting of existing electromechanical values.

It was determined by computer analysis that cross-correlation or matched filtering was unreliable in the presence of additive impulsive noise which is frequently present in electromechanical valve actuators in power and control systems. However, the Haar wavelet decomposition of the time warped valve response signal is effective in detection and analysis of valve response signal 15 in the presence of additive impulsive noise.

While the present invention has been described with respect to certain preferred embodiments thereof, it is to be understood that numerous variations in the details of construction, the arrangement and combination of parts, and the types of materials used may be made without departing from the spirit and scope of the invention.

What is claimed is:

1. Apparatus for monitoring the health and response of critical control valves by comparing the actual valve response signal with that of a normal valve response signal comprising:

a valve;

a valve actuator to actuate said valve in response to a valve control signal;

a monitor to monitor the response of said valve upon actuation of said valve to provide a valve response signal; and means to compare said valve response signal and a normal valve response signal including:

Fourier transform magnitude compiler to compile samples of the magnitudes of the sample;

wavelet transform decomposition means to provide enhanced evaluation signals representing time variations in the time warped valve response signal; and means to indicate differences between said enhanced evaluation signals and said normal valve response signal to evaluate the response and health of said valve.

2. The valve health monitoring apparatus of claim 1 wherein said valve is an electromechanical valve and said means to monitor the response of said valve is a sensor responsive to electrical input to said means to actuate said valve.

3. The valve health monitoring apparatus of claim 2 wherein said Fourier transform decomposition means is a Haar type wavelet decomposer.

4. The valve health monitoring apparatus of claim 3 wherein said electrical input is current flow through said valve actuator.

5. The valve health monitoring apparatus of claim 4 wherein said indication of the health of said valve includes indicator signal means responsive to time varying differences of said valve response signal which exceed a predetermined amount.

6. The valve health monitoring apparatus of claim 5 wherein a visual display is provided to enable visual observation of said differences in said signals.

7. The valve health monitoring apparatus of claim 1 further including switching means to selectively connect said apparatus to more than one valve for monitoring health of said more than one valve.

8. The valve health monitoring apparatus of claim 7 further including pattern recognition means to automatically evaluate time differences between said valve response signal and a normal response of said valve response signal and to actuate an alarm when said differences exceed a predetermined amount.

9. The valve health monitoring apparatus of claim 8 wherein said valve control signal initiates actuation of said monitor.

10. The valve health monitoring apparatus of claim 2 wherein said electrical input corresponds to torque applied to said valve actuator in response to said valve control signal.

11. The valve health monitoring apparatus of claim 2 wherein said wavelet decomposition means includes tiling of frequencies utilizing uneven scaling to more closely examine frequencies of said valve response signal which are of interest.

12. The valve health monitoring apparatus of claim 11 wherein means are provided to automatically evaluate said differences in said signals and actuate an alarm when said differences exceed a predetermined amount.

13. The valve health monitoring apparatus of claim 2 wherein said Fourier transform decomposer provides isolation of a desired spectral domain to enhance said correlation.

14. The valve health monitoring apparatus of claim 13 wherein said monitor is selectively connected to a plurality of valves and a library of normal valve response signals is provided to provide a normal valve response signal for each of said plurality of valves.

* * * * *